United States Patent [19]
Yokomori et al.

[11] Patent Number: 5,091,982
[45] Date of Patent: Feb. 25, 1992

[54] WAVEGUIDE TYPE OPTICAL DETECTION APPARATUS

[75] Inventors: Kiyoshi Yokomori; Shunsuke Fujita, both of Yokohama; Shigeyoshi Misawa, Tokyo, all of Japan

[73] Assignee: Ricoh Company, Ltd., Tokyo, Japan

[21] Appl. No.: 550,569

[22] Filed: Jul. 10, 1990

[30] Foreign Application Priority Data

| Jul. 11, 1989 | [JP] | Japan | 1-178294 |
| Aug. 3, 1989 | [JP] | Japan | 1-201763 |
| Aug. 17, 1989 | [JP] | Japan | 1-211757 |

[51] Int. Cl.$^5$ .............................................. G02B 6/10
[52] U.S. Cl. .......................................... 385/4; 385/7
[58] Field of Search .................... 350/96.12, 96.13; 369/44.12

[56] References Cited

U.S. PATENT DOCUMENTS

| 4,548,464 | 10/1985 | Auracher et al. | 350/96.13 X |
| 4,672,187 | 6/1987 | Fujita et al. | 369/44.12 X |
| 4,861,128 | 8/1989 | Ishikawa et al. | 350/96.13 |
| 4,971,414 | 11/1990 | Funato et al. | 350/96.12 X |

FOREIGN PATENT DOCUMENTS

| 63-71946 | 4/1988 | Japan . |
| 26906 | 1/1990 | Japan . |

*Primary Examiner*—John D. Lee
*Assistant Examiner*—Stephen W. Barns
*Attorney, Agent, or Firm*—Oblon, Spivak, McClelland, Maier & Neustadt

[57] ABSTRACT

A waveguide type optical detection apparatus which is provided on an optical integrated circuit that has a waveguide for transmitting a light from point to point through the waveguide, one or more sets of two adjacent photodetectors provided on the waveguide, and one or more light-insensitive areas existing between the two adjacent photodetectors of each set. The waveguide type optical detection apparatus includes a waveguide focusing part and one or more reflection parts, the waveguide focusing part being provided on the waveguide for allowing a light beam passing through the waveguide to be focused on each of the two adjacent photodetectors of each set, and the reflection parts provided adjacent to each of the light-insensitive areas for reflecting each of light beams sent from the waveguide focusing means forward each of the two adjacent photodetectors of each set so that the light beams are received by the photodetectors. The waveguide type optical detection apparatus can be applied to a pickup for an optical disk and a photodetector array for an optical spectrum analyzer.

11 Claims, 9 Drawing Sheets

WAVEGUIDE TYPE OPTICAL DETECTION APPARATUS

BACKGROUND OF THE INVENTION

The present invention generally relates to optical detection apparatus, and more particularly to a waveguide type optical detection apparatus which is applied to several optical integrated circuit units such as an optical disk pickup, an optical spectrum analyzer photodetector array or the like.

Generally, an optical waveguide, or a waveguide in which a light-transmitting material is used for transmitting information in the form of electric signals from point to point through the material, is commonly used for detecting a focus position in an optical disk pickup, for positioning a movable object, and for other purposes. A conventional waveguide optical detection apparatus, as disclosed, for example, in Japanese Published Patent Application No. 63-71946, provides an example of an optical waveguide apparatus which is built for detecting a focus position. On such an optical waveguide, a grating coupler is provided for transmitting in the air a light beam from a light source onto an optical disk and introducing a light reflected on the surface of the optical disk back to the waveguide. Also provided on the optical waveguide are a set of two adjacent photodetectors which are located on one end surface of the waveguide to receive a light beam sent from the grating coupler. In the case of such a conventional apparatus, the accuracy of the detection greatly depends on the width of the area between the adjacent photodetectors, and on the distance from the photodetectors to the grating coupler. To achieve better accuracy for the optical detection apparatus, it is necessary to either make the photodetector-to-coupler distance longer, or make the width of the area between the adjacent photodetectors narrower. The extent of the above described distance, however, is limited due to the design and overall size of the optical detection apparatus, and therefore it is not possible to have a distance which exceeds a prescribed maximum distance. The above described width is also limited due to the physical restriction inherent in developing a closely-aligned photodetector design on the optical waveguide. Therefore, there still remains the need to develop a new improved waveguide type optical detection apparatus which offers better detection accuracy.

In addition, a conventional waveguide optical apparatus which is adapted to an optical disk pickup unit is disclosed, for example, in an engineering research report entitled "AN INTEGRATED-OPTIC DISK PICKUP DEVICE", OQE85-72, pp. 39–46, Shingaku Giho, Vol. 85, No. 136, issued on Sept. 17, 1985 by the Institute of Electronics and Communication Engineers of Japan (IECEJ). Such a waveguide optical apparatus provides a tiny, ligthtweight optical disk pickup unit which can be produced for experimental use. However, in the conventional waveguide optical detection apparatus disclosed by this published article, there also still remains some problems which must first be resolved before such a pickup unit can be manufactured for practical use. Hence, in recent years, it has been desired that further improvements be developed for an optical disk pickup unit and relevant units which can be manufactured for practical use.

First, referring to FIG. 1, a description will be given of the above-discussed conventional waveguide optical apparatus which is applied to an optical integrated circuit for an optical disk pickup head. In this conventional apparatus, a silicon substrate 31, a buffer layer 32 and an optical waveguide layer 33 are laminated together into a thin-film integrated circuit structure. A semiconductor laser diode 34 of a light source is provided on an end surface of the silicon layer 33 for generating a laser beam, and the beam from the light source 34 is transmitted through the waveguide 33. The light beam traveling through the waveguide 33 passes through a grating 35 and a grating coupler 36, and is diffracted so that a converging light is propagated in the air until it reaches a surface of an optical disk 37. The light is then reflected on the surface of the optical disk 37 back to the grating coupler 36 and the light is again introduced into the waveguide. Then the light is diffracted by the grating 35 so as to split into two separate light beams, which are received by a set of two adjacent first photodetectors 38a, 38b, and a set of two adjacent second photodetectors 38c, 38d, respectively.

Electric signals outputted from these photodetectors when exposed to light are picked up through a logic circuit connected to suitable electrodes of the photodetectors, as shown in FIG. 1. These outputs include a readout signal S, a focusing error signal Fo and a tracking error signal Tr. The signals thus obtained from the photodetectors are expressed as follows:

$$Fo = (S_{38a} + S_{38d}) - (S_{38b} + S_{38c})$$

$$Tr = (S_{38c} + S_{38d}) - (S_{38a} + S_{38b})$$

$$S = S_{38a} + S_{38b} + S_{38c} + S_{38d}$$

In these formulas, $S_{38a}$, $S_{38b}$, $S_{38c}$ and $S_{38d}$ are output signals of the photodetectors 38a, 38b, 38c and 38d, respectively. Concerning the focusing error signal Fo, when the optical disk 37 moves away from the pickup unit, the value of the Fo becomes negative, or the Fo is smaller than 0, and on the contrary, when the optical disk 37 approaches the focus position of the pickup unit, the value of the Fo becomes positive, or the Fo is greater than 0. Therefore, this allows for appropriate detection of the focus position by using the conventional apparatus.

However, the conventional waveguide optical apparatus as shown in FIG. 1 has light-insensitive areas between the adjacent photodetectors 38a, 38b and between the adjacent photodetectors 38c, 38d. In the light-insensitive areas, light beams being sent from the grating 35 cannot be received by the photodetectors because the light-insensitive areas are located where no photodetection function is provided. Usually, the width of the light-insensitive area between the adjacent photodetectors ranges from approximately 5 to 10 microns, and it is practically impossible to make this light-insensitive area width negligible or zero.

For example, when detection of the focusing error signal is carried out with the light from the light source 34 being focused exactly on the optical disk 37, the light beams are thrown on the light-insensitive area between the photodetectors 38a and 38b as well as on the light-insensitive area between the photodetectors 38c and 38d. If the beam diameter is smaller than the light-insensitive area width, with the optical disk deviating from the focus position, the value of the Fo becomes zero and the focusing error signal is insensitive. And, if the beam diameter becomes almost at the same level as the light-insensitive area width, such "light-insensitive" condition of the focusing error signal is eliminated. However, when the optical disk deviates from the focusing position, the amount of change in the focusing error signal becomes excessively small, which worsens the sensitivity of the optical detection apparatus.

Since the light-insensitive areas cannot be made narrower than the minimum level, an immediate solution to the problem is to enlarge the distance from the grating 35 to the photodetectors 38. However, such a solution requires the development of a larger optical disk pickup design, which is inconsistent with the desired development of a tiny, lightweight integrated optic unit.

SUMMARY OF THE INVENTION

Accordingly, it is a general object of the present invention to provide a novel and useful waveguide type optical detection apparatus in which the above described problems are eliminated.

Another and more specific object of the present invention is to provide a waveguide type optical detection apparatus in which small reflector parts are provided at positions between adjacent photodetectors on a waveguide to substantially eliminate the problem of the above-described light-insensitive areas between the adjacent photodetectors. According to the present invention, it is possible to improve the sensitivity of a optical disk pickup or an optical RF spectrum analyzer, to which the waveguide type optical detection apparatus is applied, yet still provide the advantages of a tiny, lightweight apparatus. This is possible as light beams are reflected on the small reflector parts and are transmitted to the photodetectors, allowing the beams traveling toward the light-insensitive areas to be properly received by the photodetectors.

Still another object of the present invention is to provide a waveguide type optical detection apparatus which allows the forming of the waveguide reflector part and the small reflector parts at the same time in the same manufacturing process. According to the present invention, it is possible to reduce the number of processes required for manufacturing the waveguide type optical detection apparatus. In addition, it is possible to improve the quality and accuracy of the thus formed waveguide type optical detection apparatus, which promotes reduction of quality variations in finished products during volume production.

A further object of the present invention is to provide a waveguide type optical detection apparatus which has a set of photodetectors with a distance therebetween provided on a waveguide and nevertheless offers highly accurate detection of a focus position. According to the present invention, it is possible to provide better accuracy for detection of a focus position than the conventional optical detection apparatus, while using the photodetectors placed with a distance therebetween.

Other objects and further features of the present invention will be apparent from the following detailed description when read in conjunction with the accompanying drawings.

DESCRIPTION OF THE PREFERRED EMBODIMENTS

Figure 1:
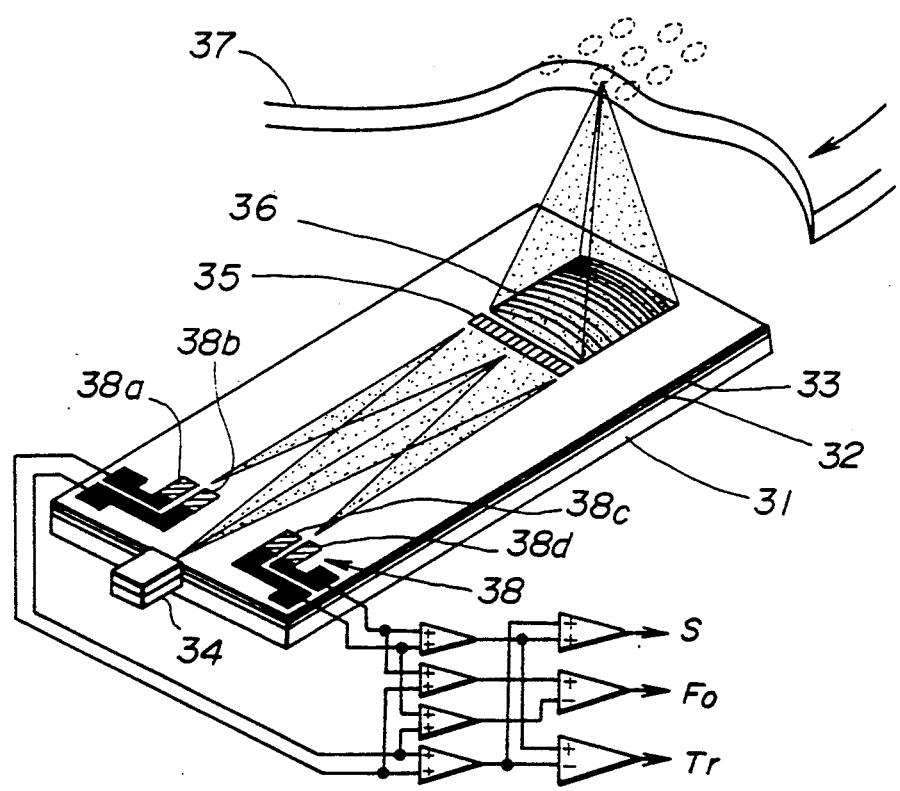
FIG. 1 is a perspective view of a conventional integrated optic disk pickup employing an optical waveguide according to the prior art.
Figure 2:
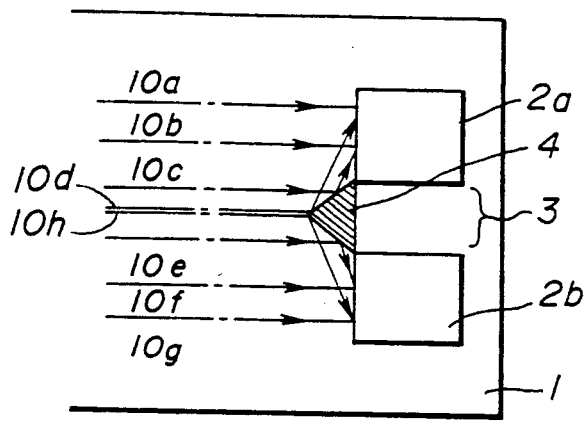
FIG. 2 is a plan view of a waveguide type optical detection apparatus for explaining the principle of the present invention.
Figure 3A:
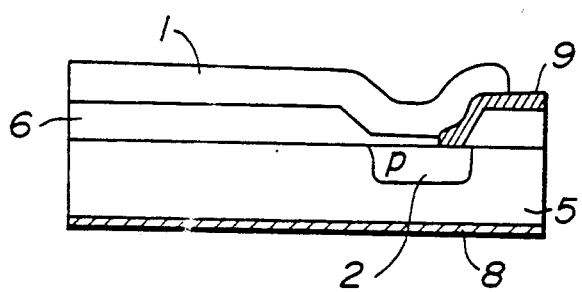
FIGS. 3A and 3B are cross-sectional views of the waveguide type optical detection apparatus.
Figure 3B:
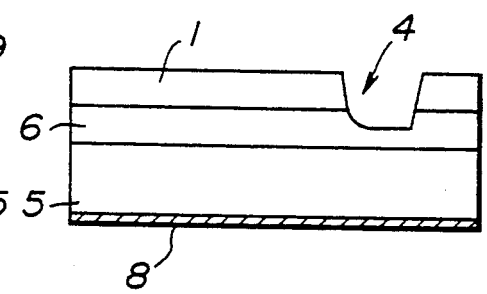

Referring to FIGS. 2, 3A and 3B, a description will be given as to the operating principle waveguide type optical detection apparatus according to the present invention.

In an integrated optic circuit structure shown in FIG. 2, two photodetector parts 2a, 2b are provided adjacent to each other on an end portion of a waveguide 1. There is a light-insensitive area 3 between the adjacent photodetector parts 2a and 2b, and due to this light-insensitive area 3 a light beam being aimed at the light-insensitive area 3 is not sensed by the two photodetector parts 2a and 2b. To avoid this, a small reflector part 4 having two equally slanting reflection surfaces is provided to allow the light beam aimed at the light-insensitive area 3 to be reflected so that the reflected beam is directed to either the photodetector part 2a or the photodetector part 2b. In the waveguide type optical detection apparatus, light beams 10a, 10b among those being transmitted through the waveguide 1 are received directly by the photodetector part 2a, and light beams 10f, 10g are received directly by the photodetector part 2b as shown in FIG. 2. And, light beams 10c, 10d are reflected on an upper-side slanting surface of the reflector part 4 so that the reflected beams are appropriately received by the photodetector part 2a. Also, light beams 10e, 10h are reflected on a lower-side slanting surface of the reflector part 4 so that they properly enter the photodetector part 2b. Therefore, it is possible for the waveguide type light detection apparatus provided with the reflector part 4, as shown in FIG. 2, to substantially eliminate the presence of a light-insensitive area between the adjacent photodetector parts 2a and 2b, enabling the optical detection covering the entire waveguide 1 including the areas where the photodetector parts are provided.

FIG. 3A shows a representative cross section of the photodetector part 2 of the waveguide type optical detection apparatus shown in FIG. 2. In an optical integrated circuit of the waveguide type optical detection apparatus, a buffer layer 6 is deposited on a silicon substrate 5, and on the buffer layer 6 a waveguide 1 is further deposited. A refractive index of the waveguide 1 is higher than that of the buffer layer 6. The photodetector part 2 is formed in the silicon substrate 5, for example, by adding any p-type dopant to the n-type material of the silicon substrate to create a p-n junction structure. In an area of the photodetector part 2, the buffer layer 6 is made excessively thin, and a light beam transmitted through the waveguide 1 reaches the photodetector part 2 through such a thin buffer layer. Thus, the photodetector part 2 receives the light, and electric signals due to the photo-electric conversion effect of the photodetector part 2 are picked up from the electrodes 8 and 9 which are connected to the photodetector part 2.

FIG. 3B shows a representative cross section of the reflector part 4 of the waveguide type optical detection apparatus shown in FIG. 2. The reflector part 4 is formed, for example, by removing a corresponding region of the waveguide 1 from the optical integrated circuit board which is made up of the substrate layer 5, the buffer layer 6 and the waveguide 1. And, in the cross section of this reflector part 4, a thickness greater than the thickness of the waveguide 1 is removed. To attain effective reflection of the light being transmitted through the waveguide 1, it is possible to carry out two methods for forming the reflector part 4. One method is to utilize total reflection of the transmitted light, while the other method is to form a single metal film or a dielectric multilayer reflective film on the boundary between the reflector part 4 and the waveguide 1. In the former method, the reflector part is formed such that the angle $\theta_i$ of incident light to the surface of the reflector part 4 satisfies the following formula:

$$\theta_i > \sin^{-1}(1/N)$$

In this formula, N is an effective refractive index of a material of the waveguide when the light is transmitted through the waveguide 1. The latter method is useful especially when the angle of the incident light to the surface of reflector part 4 is smaller than the value of $\sin^{-1}(1/N)$.

Although the photodetector part 2 in the above described embodiment is formed as a p-n junction photodiode, the present invention is not limited to this embodiment. For example, the photodetector part 2 may be formed like a p-i-n diode. And, the above described embodiment employs a buffer layer deposited on a silicon substrate, but it is possible for a dielectric substrate having no absorption and showing a refractive index smaller than that of the waveguide 1 to be used and no buffer layer is provided between such a dielectric substrate and the waveguide. Further, the photodetector part 2 may be built through forming of an amorphous silicon film. In addition, the reflector part 4 in the above described embodiment is built through etching which is performed for the corresponding region of the waveguide; however, it is also possible that at the time of forming the waveguide, the region of the waveguide corresponding to the reflector part 4 will not be formed by using a masking technique to create a cavity in the region of the waveguide.

Figure 4:
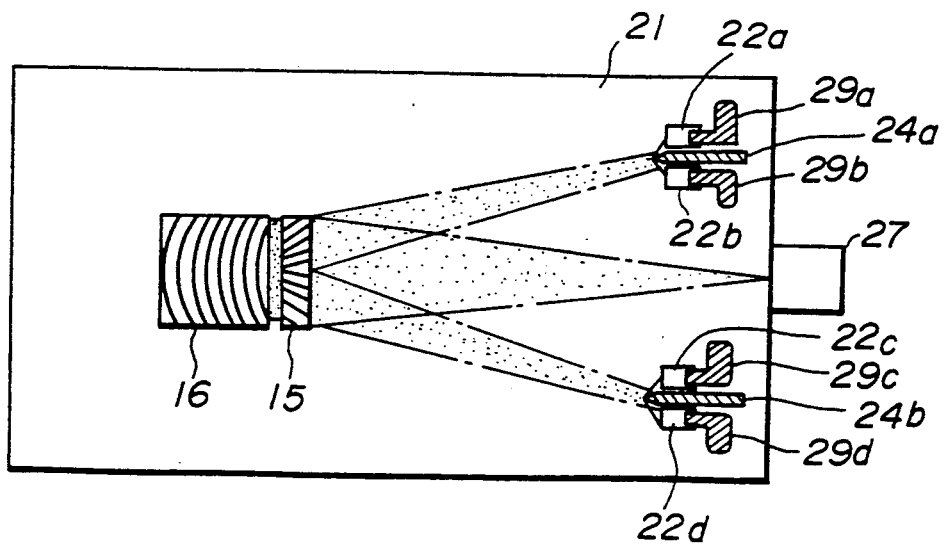
FIG. 4 is a plan view of an optical disk pickup for showing a first embodiment of a waveguide type optical detection apparatus according to the present invention.

Referring next to FIG. 4, a description will be given of a first embodiment of a waveguide type optical detection apparatus according to the present invention, which is applied to an optical disk pickup. In an optical integrated circuit of the optical disk pickup, a buffer layer (not shown) is deposited on a silicon substrate, and on the buffer layer a waveguide 21 is deposited. And provided in the optical integrated circuit are a grating 15, a focusing grating coupler 16, a plurality of photodetectors 22a, 22b, 22c, 22d, a semiconductor laser diode 27, and a plurality of electrodes 29a, 29b, 29c, 29d respectively being connected to the photodetectors 22a, 22b, 22c, 22d. Further provided are a reflector part 24a between the photodetectors 22a and 22b, and a reflector part 24b between the photodetectors 22c and 22d. The semiconductor laser diode 27, or a light source for generating a laser beam, is provided on an end surface of the waveguide 21 so that the laser beam from the semiconductor laser diode 27 is transmitted through the waveguide 21. The transmitted beam passes through the grating 15 and is diffracted by the grating coupler 16 so that light is transmitted through the air and thrown onto an optical data storage medium (not shown). Then, the light reflected on the surface of the optical data storage medium reenters the grating coupler 16 and is transmitted again through the waveguide 21. The light is diffracted by the grating 15 and is split into two different beams of light. One of these beams is reflected by the reflector part 24a so that the photodetectors 22a, 22b can receive the reflected beam. The other beam is reflected by the reflector part 24b so that the photodetectors 22c and 22d can receive the reflected beam. Electric signals given from the photodetectors 22a, 22b, 22c, 22d are picked up from the electrodes 29a, 29b, 29c, 29d respectively connected to the photodetectors 22a, 22b, 22c, 22d.

In the optical disk pickup shown in FIG. 4, the beams are thrown on a place between the photodetectors 22a and 22b and on a place between the photodetectors 22c and 22d, respectively, when a light beam is focused accurately on the optical data storage medium. As described above, the provision of the reflector parts 24a, 24b at the places corresponding to light-insensitive areas between the photodetectors allows all the beams from the grating 15 to be correctly received by any of the photodetectors 22a, 22b, 22c, 22d. Each of the reflector parts 24a, 24b has two equal slanting surfaces defining two equal sides of an isosceles triangle with a vertex point to which the transmitted beam is directed. When the optical data storage medium comes closer to or moves away from the focus point of the grating coupler 16, even a small quantity of the light separated by each of the reflector parts 24a, 24b is changed. Accordingly, the quantity of the light received by each photodetector is also changed in an expected manner, so that one can get a focusing error signal with good sensitivity using the above described optical disk pickup.

Figure 5:
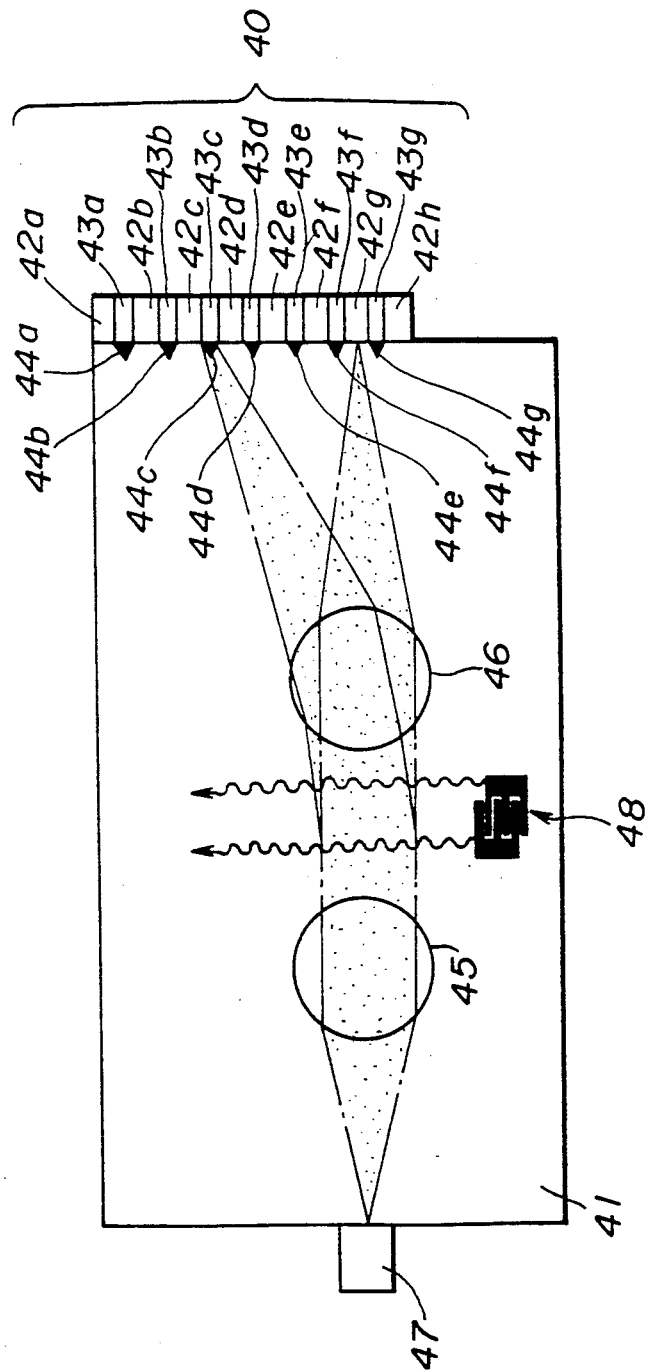
FIG. 5 is a plan view of an optical RF spectrum analyzer for showing a second embodiment of a waveguide type optical detection apparatus according to the present invention.

Referring next to FIG. 5, a description will be given of a second embodiment of a waveguide type optical detection apparatus according to the present invention, which is applied to a RF spectrum analyzer. As shown in FIG. 5, in an optical waveguide 41 which is made from titanium-diffused lithium niobate, conventional-type geodesic lenses 45 and 46 are formed. The titanium-diffused lithium niobate is prepared by diffusing a small quantity of titanium (Ti) on a lithium-niobate substrate (not shown). A transducer 48 is provided to generate an elastic surface wave so that it is directed to a place between the two geodesic lenses 45 and 46 and travels across a path of a transmitting light beam as shown in FIG. 5. A semiconductor laser diode 47, or a light source for generating a laser beam which is transmitted through the waveguide 41, is joined to an end surface of the waveguide 41. A photodetector array 40 including light-receiving parts 42a, 42b, 42c, 42d, 42e, 42f, 42g, 42h and alternately aligning light-insensitive areas 43a, 43b, 43c, 43d, 43e, 43f, 43g is provided on the other end surface of the waveguide 41. And, at respective places corresponding to the light-insensitive areas 43a, 43b, 43c, 43d, 43e, 43f, 43g of the array 40 in the waveguide 41, small reflector parts 44a, 44b, 44c, 44d, 44e, 44f, 44g are provided. Each of the small reflector parts has two slanting reflection surfaces.

In the thus arranged RF spectrum analyzer, a light beam from the semiconductor laser diode 47 is collimated by the lens 45 on the light source side, and is focused by the lens 46 on the array side so that the beam converges on the light-receiving part 42g. In this state, if a RF signal to be subjected to spectrum analysis is applied to the transducer 48, the transducer 48 generates an elastic surface wave and the generated wave is transmitted in the upward direction of FIG. 5, traveling across an area of the waveguide 41 between the lenses 45 and 46. The light being transmitted through the waveguide 41 is diffracted by the elastic surface wave, and the light being focused by the lens 46 is directed to an upper light-receiving part of the photodetector array 40 which is located above the light-receiving part 42g when no RF signal is applied. The light when the RF signal is applied is received by a different light-receiving part of the photodetector array 40 than the light-receiving part 42g. In the RF spectrum analyzer as shown in FIG. 5, such a difference in location between the part actually receiving the light and the light-receiving part 42g depends on the frequency of the RF signal. When the RF signal has a high frequency, the light is directed to an upper light-receiving part near to the part 42a. When the RF signal has a low frequency, the light is directed to a lower light-receiving part near to the part 42f. This enables the frequency of the RF signal to be measured with the photodetector array 40. According to the present invention, the RF spectrum analyzer having the small reflector parts 44a, 44b, 44c, 44d, 44e, 44f, 44g allows all possible frequencies of the RF signal to be measured with the photodetector array 40, thus achieving good accuracy of spectrum analysis.

Figure 6:
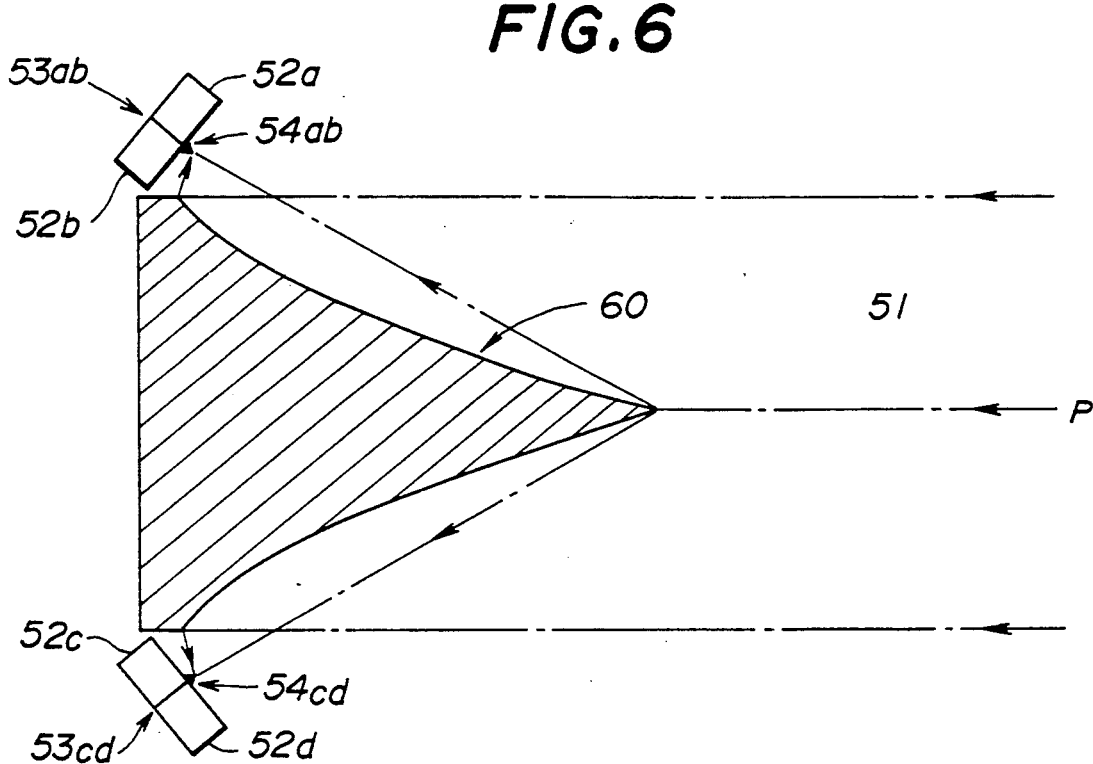
FIG. 6 is a plan view showing a third embodiment of a waveguide type optical detection apparatus according to the present invention.

Referring next to FIG. 6, a description will be given of a third embodiment of a waveguide type optical detection apparatus according to the present invention. In FIG. 6, there is a waveguide reflection component 60 which utilizes total reflection. The waveguide reflection component 60 is provided on an optical waveguide 51 to define an end surface of the waveguide 51 having two symmetrically arranged concave parabolic surfaces. And a pair of first photodetectors 52a, 52b, and a pair of second photodetectors 52c, 52d are provided at appropriate positions on the waveguide. There exists a first light-insensitive area 53ab between the adjacent first photodetectors 52a and 52b, and a second light-insensitive area 53cd between the adjacent second photodetectors 52c and 52d. Small reflector parts 54ab and 54cd respectively are provided at places corresponding to the light-insensitive areas 53ab and 53cd along the line of a light being reflected on the end surface of the waveguide 51. In this waveguide reflection component 60, an incoming light P is reflected on the end surface 60 of the waveguide 51 and the reflected light is focused. When the incoming light P is a parallel beam of light, the reflected light converges at a point which corresponds with the focus of the parabolic surface of the waveguide reflection component 60. The small reflector parts 54ab, 54cd which are provided at points each corresponding to the parabolic surface's focus, allow the incoming beam of light to be directed toward the photodetectors 52a, 52b, 52c and 52d. The easily seen function of the small reflector parts is that an incoming light passes within the waveguide type light sensitive apparatus as if there were no light-insensitive area between the photodetectors 52a and 52b and between the sensitive devices 52c and 52d.

Next, a description will be given of the method for producing the waveguide type optical detection apparatus of this embodiment. The waveguide type optical detection apparatus is produced, for example, through a photolithography technique. Basically, after an etching or diffusion process is ended, an end surface of an integrated optic waveguide is formed into an optical reflection surface by using a photomask defining a desired pattern of the optical waveguide reflection surface. And, the small reflector parts 54ab, 54cd between adjacent photodetectors are designed to be in the same layer of the integrated optic circuit structure as that of the waveguide reflection component 60. Therefore, the small reflector parts 54ab and 54cd to be formed between adjacent photodetectors can be produced in the same manufacturing step as that of the waveguide reflection component 60. This is achieved by simply adding a pattern for forming the small reflector parts to a photomask having a pattern for forming the waveguide reflection component.

Both the waveguide reflection component 60 and the small reflector parts 54ab, 54cd are formed through etching of the waveguide 51 to remove its thickness of the waveguide or more which is performed with masking patterns. Such etching may be carried out by including the masking patterns in the same photomask.

Figure 7:
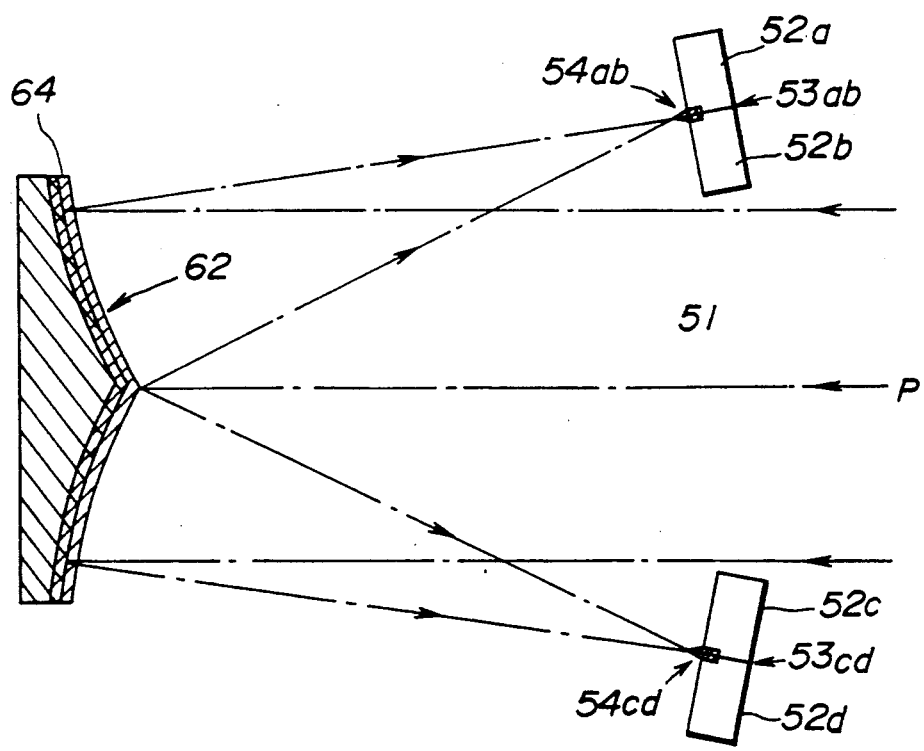
FIG. 7 is a plan view showing a fourth embodiment of a waveguide type optical detection apparatus according to the present invention; are enlarged views of the FIGS. 8A and 8B are enlarged views of the small reflector parts 54, 54' each of which is formed between the photodetectors 52a and 52b.

FIG. 7 shows an example of a waveguide reflection component 62 which utilizes normal reflection. The waveguide reflection component 62 is provided at an end portion of the waveguide 51 and formed with a metal reflector part 64. In this embodiment, it is possible to provide a metal reflector part, similar to the metal reflector part 64, on the small reflector parts 54ab, 54cd as well. The provision of a metal reflector part on a small reflector part is optional for individual applications. The forming of such a metal reflector part is carried out by including each masking pattern for forming metal reflector parts on the small reflector parts 54ab, 54cd in a photomask for forming the metal reflector part 64.

Figure 8A:
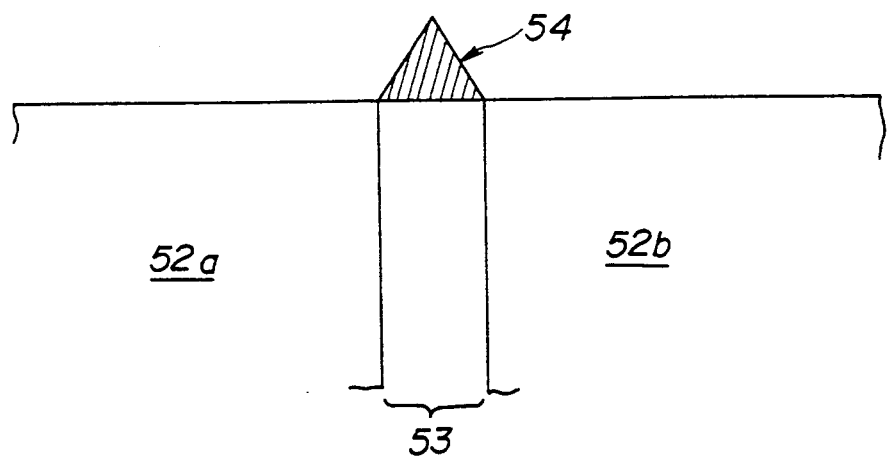

Referring next to FIG. 8A, a description will be given of the small reflector part 54 and the relation of the small reflector part 54 to the photodetectors 52a and 52b. The small reflector part 54 has two reflection surfaces. These reflection surfaces may be formed to have a cross section of a straight line, a curved line, or a number of straight lines approximate to a curved line. However, it is necessary that the small reflector part 54 be formed to have the reflection surfaces at angles not smaller than a total reflection angle to the incoming light when total reflection is utilized, or to have the reflection surfaces at angles not smaller than 45 degrees to the incoming light when normal reflection is utilized.

Figure 8B:
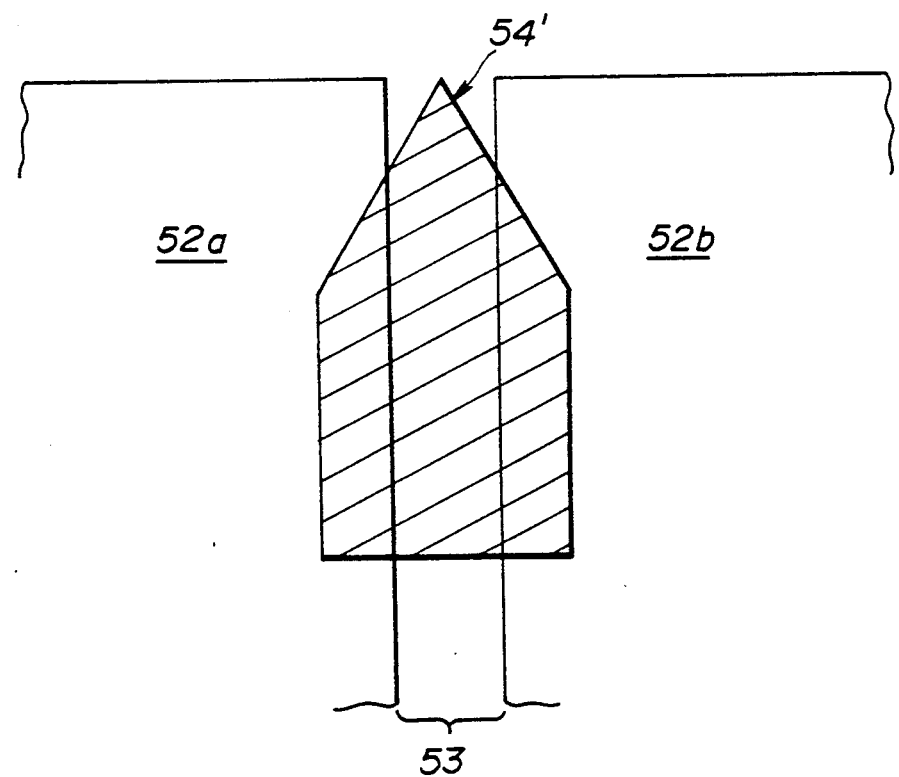

Referring next to FIG. 8B, a description will be given of a modified small reflector part 54' formed between the photodetectors 52a and 52b. In this embodiment, the small reflector part 54' is provided so that a vertex at the common end of the two reflection surfaces of the device 54' is aligned approximately with a line at the front edges of the photodetectors 52a and 52b. The small reflector part 54' has a shape and dimensions with a margin to provide overlaps between the small reflector part 54' and the photodetectors 52a, 52b, for minimizing an error of positioning of the device 54' with respect to the devices 52a, 52b. Although the error of positioning causes a slight change of the vertex location, it is possible to eliminate the problem of the light-insensitive areas and to maintain the function of making effective use of incoming light.

In addition, when producing the above described waveguide type optical detection apparatus having a waveguide reflector part and a small reflector part, the waveguide reflector part and the small reflector part conventionally are formed in separate processes. The process for forming the waveguide reflector part is similar to the process for forming the small reflector part. Therefore, repeating such a similar forming process causes an increase of the number of processes, and accompanying this, there is an increase in the cost of manufacturing products. In addition, it is difficult to accurately position a photomask for both the circuit devices formed in different processes, when a photolithography is used. The waveguide reflector part and the small reflector part must be accurately positioned because the sensitivity of the measurement being carried out with the waveguide type optical detection apparatus greatly depends on the relative positions of the waveguide reflector part and the small reflector part which are formed on the optical integrated circuit. Accordingly, the conventional apparatus often experiences a problem that an error as to matching of a photomask on the circuit devices during manufacture worsens the optical detection accuracy by the waveguide type optical detection apparatus, thereby leading to a wider range of variations.

Referring next to FIGS. 9, 10, and 11A through 11F, a description will be given of a fifth embodiment of a waveguide type optical detection apparatus according to the present invention.

Figure 9:
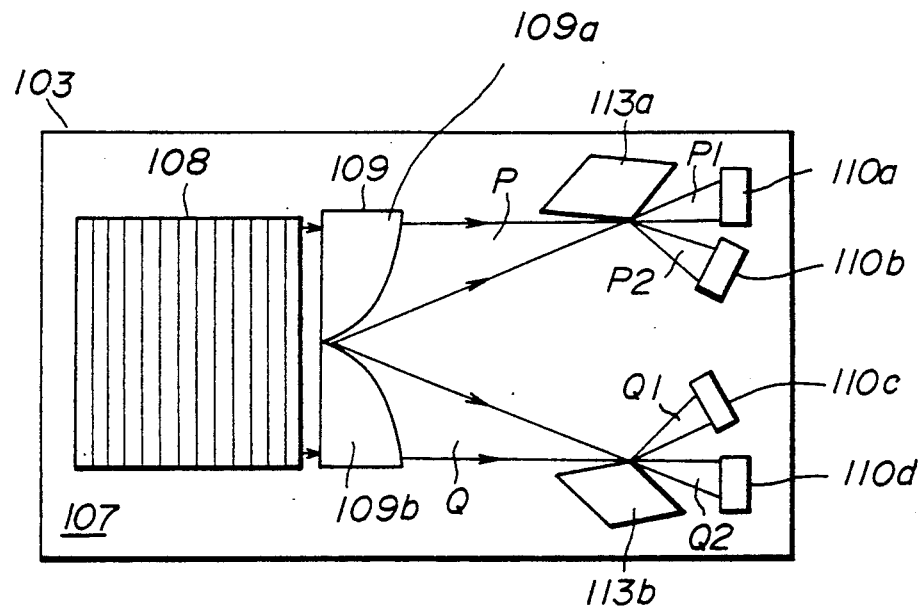
FIG. 9 is a plan view showing a fifth embodiment of a waveguide type optical detection apparatus according to the present invention.
Figure 10:
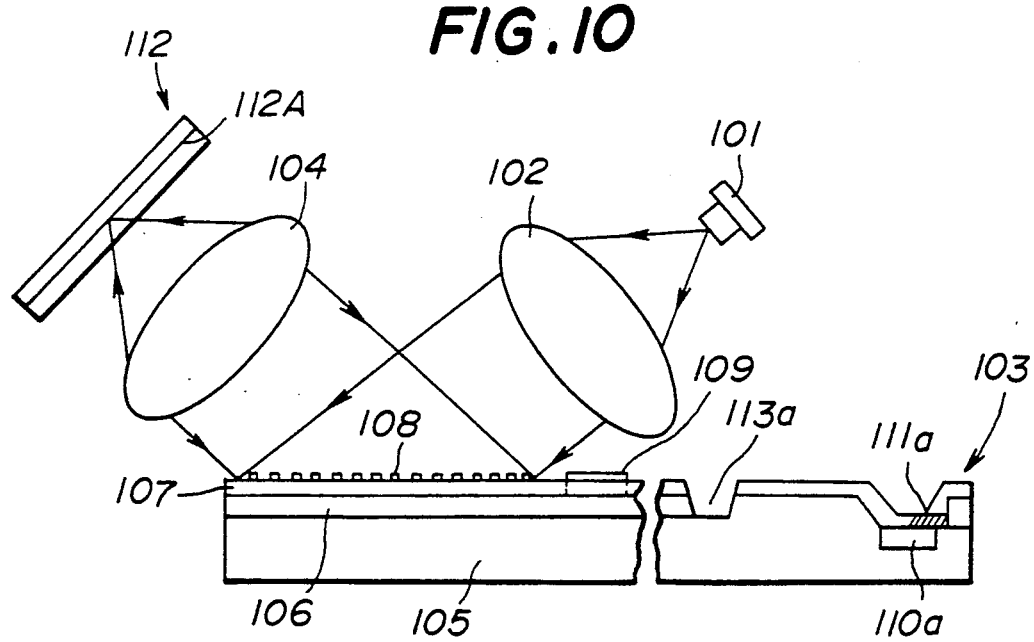
FIG. 10 is an optical disk pickup which employs the fifth embodiment of the waveguide type optical detection apparatus.

FIG. 9 shows a fifth embodiment of a waveguide type optical detection apparatus according to the present invention, and FIG. 10 shows an optical disk pickup to which the waveguide type optical detection apparatus of FIG. 9 is applied. As shown in FIG. 10, a light beam from a light source 101 is collimated by a collimator lens 102 and a collimated light beam comes into a waveguide component 103. In the waveguide component 103, the collimated beam is reflected on a boundary surface between a substrate 105 and a cladding 106 so that a reflected beam enters a focusing lens 104. The beam entering the focusing lens 104 is focused on a surface of an optical data storage medium 112A which is, for example, an optical disk, an optical card, etc. The beam is reflected on the surface of the optical data storage medium 112A back to the waveguide component 103 through the focusing lens 4. The waveguide component 103 is formed with an optical waveguide 107 on which a coupler 108 and a beam splitter 109 are provided. A part of the reentrant beam is diffracted by the coupler 108 and guided to the waveguide 7. The guided beam first enters the beam splitter 109 which serves to focus an incoming beam.

As shown in FIG. 9, the beam splitter 109 has two lens portions 109a and 109b. The lens portions 109a and 109b are formed from a convex optical lens which is cut into two halves, and arranged sidewise on the waveguide with one of the cut surfaces of the two halves facing a direction opposite to the other cut surface and one half being aligned at its bottom in contact with the other half at its top. The beam passing through the beam splitter 109 is split into two separate beams P and Q which are respectively focused by the lens portions 109a and 109b, the two separate beams aiming at two different points. These points on which the beams P and Q are focused respectively correspond with positions of waveguide mirrors 113a and 113b which are provided on the waveguide component 103. The waveguide mirrors 113a and 113b each have a diamond shape with suitable reflection surfaces which are capable of reflecting a part of each of the beams P and Q properly to a position of the corresponding photodetector. However, the overall shape of the waveguide mirrors is not limited to that of the shown examples but is optional if the functions thereof are attainable as described herein. Also, the positions of the waveguide mirrors arranged on the waveguide are not restricted to the shown examples but are optional if the function is attainable as described above. The beam P is partially reflected by the waveguide mirror 113a, and, from the focus position on the waveguide mirror 113a, it is separated into a non-reflected diverging beam P1 and a reflected diverging beam P2, which respectively are received by photodetectors 110a and 110b. Similarly, the beam Q is partially reflected by the waveguide mirror 113b, and is separated into a reflected diverging beam Q1 and a non-reflected diverging beam Q2, which respectively are received by photodetectors 110c and 110d. The photodetectors 110a and 110b constitute a set of first photodetectors and the photodetectors 110c and 110d constitute another set of second photodetectors.

In the above described embodiment, two waveguide mirrors and two sets of first and second photodetectors are employed so as to obtain a focusing error signal as well as a tracking error signal. However, in the case where the detection of the focus position only is desired, the provision of a single waveguide mirror and a single set of photodetectors may be adequate for attaining such a desired purpose. In addition, the diamond-shaped waveguide mirrors 113a and 113b, may be formed by removing a thickness of at least waveguide 107 in the corresponding regions through a photolithographic technique (e.g. dry etching) into a concave portion, as shown in FIG. 10. The beam is totally reflected on an end surface of such a cut-out portion, which may otherwise be a metal film being formed on the boundary between the substrate and the cladding, such a metal film being capable of normally reflecting the beam on the surface fo such a metal film.

The photodetctors 110a through 110d are, for example, a junction type photodiode which is formed on the substrate 105 as shown in FIG. 10. The photodetector 110a is designed to receive a light beam traveling through the waveguide 107. An electric signal change of the photodetectors when they are exposed to light is picked up from an electrode 111a connected to the photodetector 110a. Concerning the light source 101, a laser light source such as a semiconductor laser diode, or a light emitting diode may be used, but it is preferable to use 1y a light source capable to emitting a light with good coherence in the aspect of space. Concerning the substrate 105, a metal, a dielectric, a glass or the like may be used as the substrate 105 of the waveguide component 103, but in this embodiment a semiconductor such as silicon, gallium arsenide is employed. When a semiconductor substrate is used as the substrate 105 in the above described embodiment, a photodetector may be built within the semiconductor substrate. However, since in the above described embodiment the beam from the light source 101 is reflected on the substrate surface, if a refractive index of the substrate is smaller than that of the cladding, it is necessary to form a reflection metal film or the like between the substrate and the cladding.

Concerning the cladding 106 and the waveguide 107, these are formed from a transparent material such as a dielectric. However, it should be noted that a refractive index of the waveguide 107 must be greater than that of the cladding 106. Concerning the coupler 108, a grating coupler is used in the above described embodiment, which may be formed into a grating having equally spaced straight lines. Such a grating coupler may be built, for example, by forming a substrate into a thin film and applying etching or diffusion or cutting to the thin film to create a grating. Concerning the photodetectors, a junction type photodiode is used in the above described embodiment. Instead of this type, a Schottky barrier diode may be used, or otherwise, an alpha-silicon photodiode is also usable when a particular type of substrate material is employed.

Figure 11A:
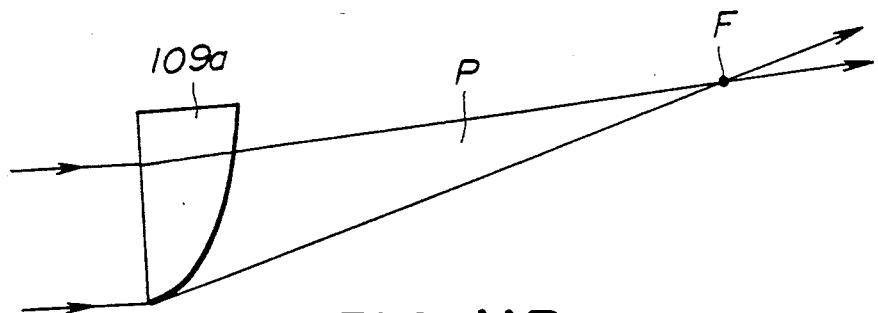
FIGS. 11A through 11F are diagrams for explaining the principle of the fifth embodiment of the present invention.

FIG. 11A shows a condition of the focusing beam from the focusing lens 104 which is focused accurately on the surface of a subject body, or an optical data storage medium 112A. This corresponds with the condition in which the focal point of the focusing lens 104 lies on the optical data storage medium 112A. The beam passing through the lens portion 109a of the beam splitter 109 is transmitted through the waveguide and converges on a focal point F. After passing through the focal point F, the beam diverges.

Figure 11B:
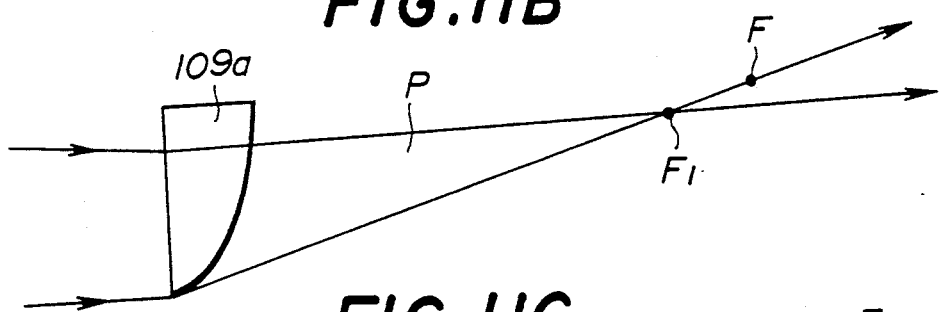

When the optical data storage medium 112A moves away from the focusing lens 104 and the position of the medium 112A increasingly deviates from the focal point of the lens 104, the light being introduced by the coupler 8 into the waveguide slightly converges before entering the lens portion 109a. As shown in FIG. 11B, the light passing through the lens portion 109a is focused on a point $F_1$ which is nearer to the lens portion 109a than the point F. This show that the forwarding direction of the light P shown in FIG. 11B is rotated slightly in a clockwise direction from the forwarding direction of the light P shown in FIG. 11A.

Figure 11C:
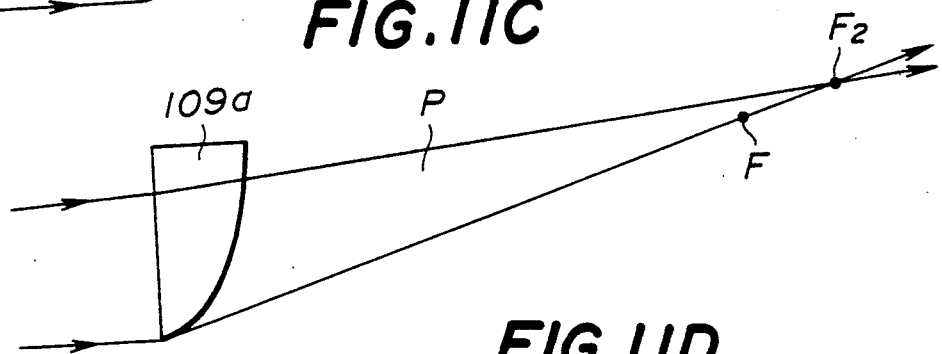

In contrast, when the optical data storage medium 112A comes closer to the focusing lens 104 and the deviation of the medium 112A from the focal point of the lens 104 is decreasing, the light being introduced by the coupler 8 into the waveguide slightly diverges before entering the lens portion 109a. As shown in FIG. 11C, the light passing through the lens portion 109a is focused on a point $F_2$ which is farther from the lens portion 109a than the point F. This shows that the forward direction of the light P shown in FIG. 11C is rotated slightly in a counterclockwise direction from the forwarding direction of the light P shown in FIG. 11A.

Figure 11D:
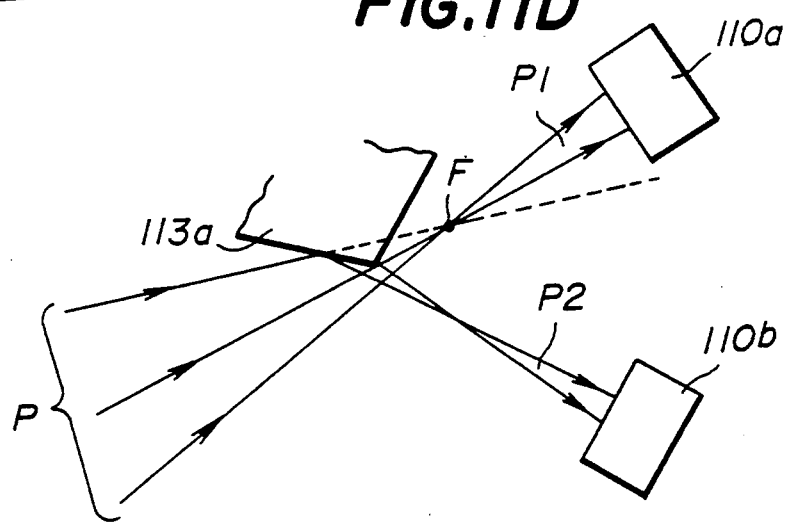

The waveguide mirror 113a, as shown in FIG. 11D, reflects a part of the light being aimed at the focal point F of the lens portion 109a (in this case, the medium 112A is at the focus position of the focusing lens 104), and the remaining part of the light travels straight throughout the focal point F with no reflection. Thus, the light is split into two separate light beams P1, P2. The relative positions of the lens portion 109, the photodetectors 110a, 110b and the waveguide mirror 113 are arranged on the waveguide, so that the beams P1 and P2 having the same quantity of light are received accurately by the photodetectors 110a and 110b, respectively. In the case where the quantities of light received by the photodetectors 110a and 110b differ from each other, adjustment of the sensitivity of each of the photodetectors 110a and 110b may be performed to make electric signals from the photodetectors 110a and 110b of the same level. Thus, when the medium 112A is exactly at the focus position of the focusing lens 104, an output A of the photodetector 110a is equal to an output B of the photodetector 110b. The relative positions of the lens portion 109b, the waveguide mirror 113b and the photodetectors 110c, 110d are arranged symmetrically with those of the lens portion 109a, the waveguide mirror 113a, and the photodetectors 110a, 110b described above.

Figure 11E:
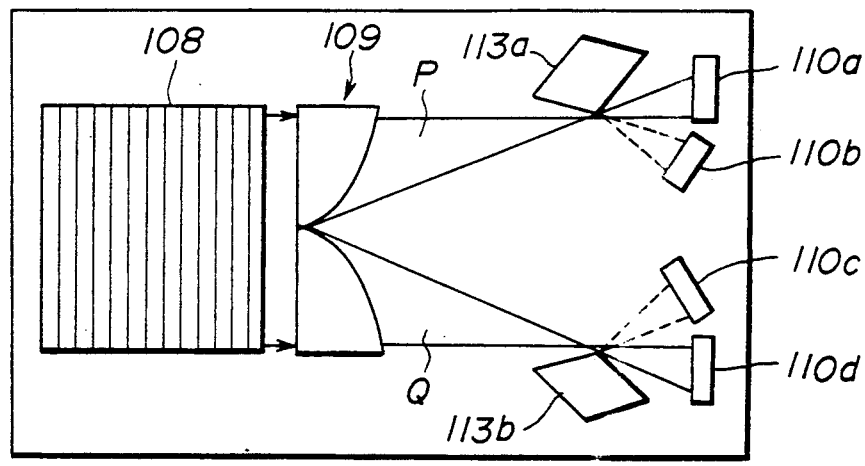
Figure 11F:
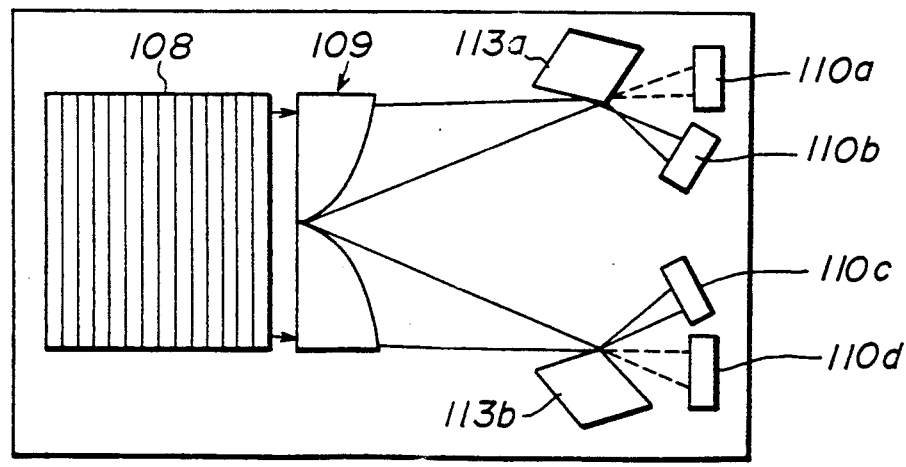

When the medium 112A moves away from the focusing lens 104 and deviation from the focus position of the lens 104 starts increasing, the quantity of light received by the photodetectors 110a, 110d is increased and the quantity of light received by the photodetectors 110b, 110c is decreased as shown in FIG. 11E. In contrast, when the medium 112A approaches the focusing lens 104 and the deviation from the focus position of the lens 104 is still decreasing gradually until the focus position is reached, the quantity of light received by the photodetectors 110b, 110c is increased and the quantity of light received by the photodetectors 110a, 110d is decreased, as shown in FIG. 11F. Accordingly, when the medium 112A is at the same position as the focus position of the focusing lens 104, the outputs A, B, C, D of the photodetectors 110a, 110b, 110c, 110d are represented by the following formula:

$$(A+D)-(B+C)=0$$

Hence, it is possible to carry out automatic focusing control by performing a focusing servo with respect to the focusing lens 104 if the $(A+D)-(B+C)$ is taken as a focusing error signal. In addition, in the case where the optical data storage medium 112 has a track that is used for tracking, it is possible to carry out automatic tracking control through a conventional push-pull technique if the $(A+B)-(C+D)$ is taken as a tracking error signal.

In the foregoing embodiments, the present invention is applied to an integrated optic disk pickup unit. However, the present invention is also applicable to a technique for positioning a movable object. For example, within the optical detection apparatus shown in FIG. 10, a movable object having a reflection surface is located in place of the optical data storage medium 112. If the relative positions of the focusing lens 104, the waveguide component 103 and the light source 101 are arranged with respect to a target point on the reflection surface of the object to be positioned, the above described focusing error signal becomes zero at the target point. Thus, positioning can be carried out by correctly adjusting the position of the object to be positioned while checking that the focusing error signal becomes zero.

Figure 12:
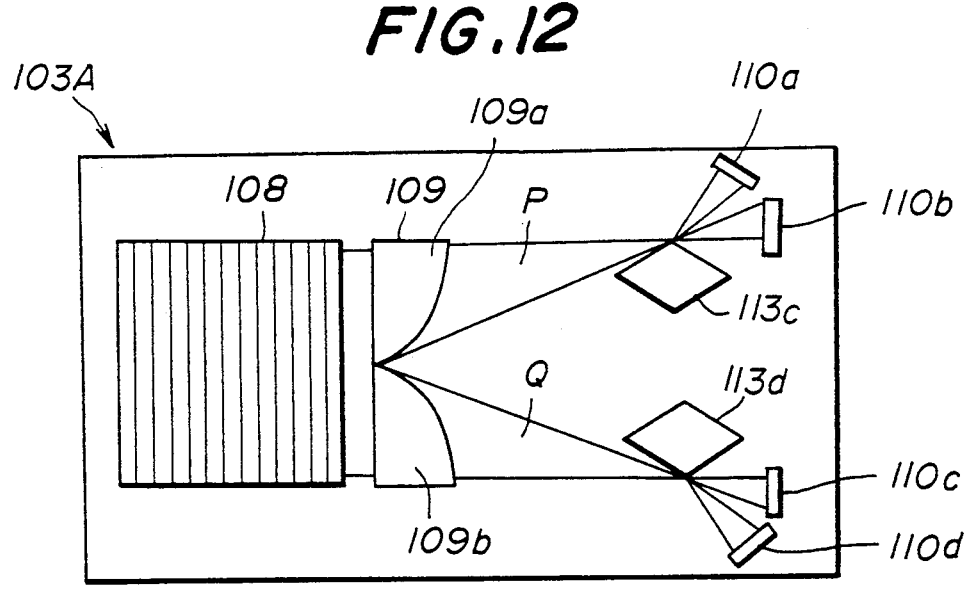
FIG. 12 is a plan view showing a sixth embodiment of a waveguide type optical detection apparatus according to the present invention.
Figure 13:
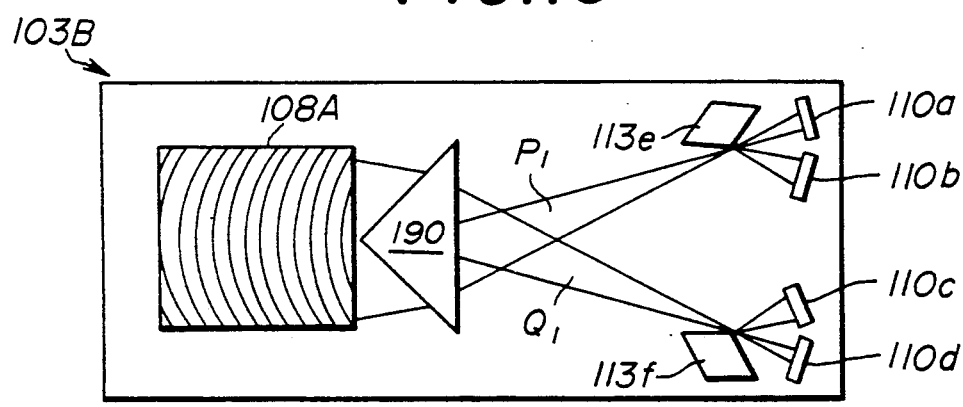
FIG. 13 is a plan view showing a seventh embodiment of a waveguide type optical detection apparatus according to the present invention.
Figure 14:
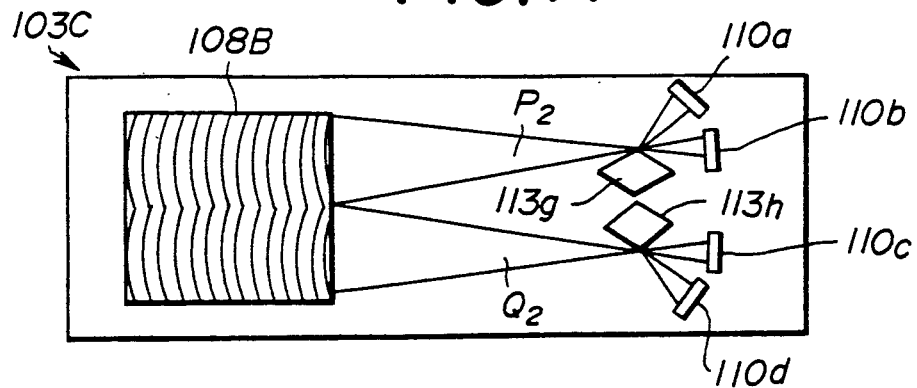
FIG. 14 is a plan view showing an eighth embodiment of a waveguide type optical detection apparatus according to the present invention.

Finally, a few modified examples of an optical disk pickup to which the optical detection apparatus of the present invention is applied are described below, as shown in FIGS. 12 through 14.

FIG. 12 shows a sixth embodiment of the optical detection apparatus which is applied to the optical disk pickup. Instead of the waveguide component 103 of FIG. 9, a waveguide component 103A shown in FIG. 12 is used for the optical disk pickup. The positions where waveguide mirrors 113c, 113d which divide an incoming light beam traveling through the waveguide into two separate beams P and Q are provided on the waveguide are different from those in FIG. 9. The positions are opposite to those of the waveguide mirrors 113a, 113b in FIG. 9 with respect to the beams P, Q, respectively, and they are located at positions behind the focus positions of the lens portions 109a, 109b. The focusing error signal and the tracking error signal are the same as those in FIG. 9.

FIG. 13 shows a seventh embodiment of the optical detection apparatus which is applied to the optical disk pickup. Instead of the waveguide component 103 of FIG. 9, a waveguide component 103B shown in FIG. 13 is used for the optical disk pickup. A focusing grating coupler 108A and a waveguide prism 190 are provided on the waveguide component 103B. The waveguide prism 190 divides an incoming light beam traveling through the waveguide into two separate beams P1 and Q1. The focusing grating coupler 108A performs both coupling an focusing: coupling of an incoming light into the waveguide and focusing of an outgoing light traveling through the waveguide. In the waveguide, a converging light beam sent from the focusing grating coupler 108A is divided into the two light beams P1 and Q1 by the waveguide prism 190, the light beam P1 is further separated into two beams by a waveguide mirror 113e and the light beam Q1 is further divided into two beams by a waveguide mirror 113f. Thus, these four separate light beams are properly received by the photodetectors 110a, 110b, 110c and 110d, respectively. Hence, electric signals A, B, C and D outputted from the photodetectors 110a, 110b, 110c and 110d when exposed to light can be used for focusing control by the focusing error signal (A+D) −(B+D) as well as for tracking control by the tracking error signal (A+B)−(C+D).

FIG. 14 shows an eighth embodiment of the present invention. Instead of the waveguide component 103 of FIG. 9, a waveguide component 103C shown in FIG. 14 is used for the optical disk pickup. A double-focusing grating coupler 108B is provided on the waveguide component 103C. The double-focusing grating coupler 108B divides a light beam traveling through the waveguide into two separate beams P2 and Q2. And the double-focusing grating coupler 108B also performs both coupling and focusing: coupling of an incoming light into the waveguide and focusing of an outgoing light traveling through the waveguide. In the waveguide, each of the two separate converging light beams P2 and Q2 sent from the focusing grating coupler 108A is further divided into two beams by a waveguide mirror 113g or a waveguide mirror 113h. Thus, these four separate light beams are properly received by the photodetectors 110a, 110b, 110c and 110d, respectively. The focusing error signal and the tracking error signal are the same as those in FIG. 9. The positions of the waveguide mirrors 113g and 113h are the same as those of the waveguide mirrors 113c, 113d in FIG. 12.

Further, the present invention is not limited to these embodiments but various variations and modifications may be made without departing from the scope of the present invention.

What is claimed is:

1. An optical detection apparatus provided on an optical integrated circuit which includes a waveguide, a light source for emitting light, a focusing means for converging the emitted light from the light source on a position of a target object so that the converged light is reflected from the target object, a coupler for coupling the light reflected back from the target object with the waveguide, one or more sets of two adjacent photodectors provided on the waveguide for receiving the light coupled with the waveguide so that an optical detection signal is supplied, and one or more light-insensitive areas between the two adjacent photodetectors of each said set, said optical detection apparatus comprising:

waveguide focusing means provided on the waveguide for focusing the light beam traveling through said waveguide and splitting said light beam into two split light beam such that each of said two split light beams is led to each of said light-insensitive areas;

reflector means provided adjacent to each of said light-insensitive areas for leading each of said two separate, split light beams from said waveguide focusing means to each of said two adjacent photodetectors of each said set; and a transducer provided on the waveguide for generating an elastic surface wave traveling across a path of the light beam transmitting through the waveguide, said waveguide focusing means being formed as a pair of focusing elements on the waveguide so that the light beam is diffracted by said elastic surface wave and the direction of the light beam transmitted through the waveguide is varied, depending on the frequency of a signal applied to the transducer.

2. An optical detection apparatus as claimed in claim 1 wherein said waveguide focusing means has two symmetrically arranged concave parabolic surfaces, a light beam received by each parabolic surface having a focal point at a place corresponding to each of said light-insensitive areas so that said waveguide focusing means serves to focus the light beam traveling through the waveguide on said focal point when receiving a parallel light beam, said reflector means being provided at a place that allows said reflector means to receive said separate light beams from said waveguide focusing means.

3. An optical detection apparatus as claimed in claim 1 wherein said waveguide focusing means and said reflector means are capable of being formed on said optical integrated circuit in a single production process, so that relative positions between said photodetectors, said reflector means and said waveguide focusing means are predetermined in said single production process.

4. An optical detection apparatus as claimed in claim 3, wherein said single production process is achieved by using a photomask with a pattern for the optical integrated circuit, said pattern defining a shape and dimensions of said photodetectors, said reflector means and said waveguide focusing means relative to said optical integrated circuit.

5. An optical detection apparatus provided on an optical integrated circuit for detecting a focusing error of light converging on a target object, said optical integrated circuit having a waveguide, a light source for supplying a first light beam traveling through said waveguide, a focusing means for focusing said first light beam on a position of the target object so that the converged light is reflected from the target object, a coupler for coupling a second light beam reflected back from said target object into said waveguide, one or more sets of two photodetectors provided on the waveguide for receiving the light coupled with the waveguide so that optical detection signals are supplied, the two photodetectors of each said sat being placed with a distance therebetween, and one or more light-insensitive areas between the two adjacent photodetectors each said set, said optical detection apparatus comprising:

reflector means provided on said waveguide for reflecting a part of said second light beam so that said second light beam is split into two separate light beam each of which is led to and received by each of the two photodetectors of any set among said one or more sets; and waveguide means provided on said optical integrated circuit, said waveguide means being formed into a single piece which comprises at least said waveguide, said coupler, said photodetectors and said reflector means, wherein said focusing means, said reflector means and said two photodetectors are arranged at predetermined relative positions on said waveguide, thereby allowing the quantity of light received by each of said two photodetectors to be varied asymmetrically depending on the target object's deviation from the focus position of said first light beam given by said focusing means.

6. An optical detection apparatus as claimed in claim 5, wherein each said set of two photodetectors receives said second light beam having the same quantity of light when the target object is placed at the focus position of the first light beam given by said focusing means, and when the position of the target object deviates from the focus position, the quantity of light received by one of the two photodetectors of each said set is increased and the quantity of light received by the other photodetector is asymmetrically decreased.

7. An optical detection apparatus as claimed in claim 6, wherein said waveguide means further comprises second focusing means provided adjacent to said coupler for allowing an outgoing light beam to be focused on each of said reflector means when an incoming light beam traveling through said waveguide is received from said coupler, each of said reflector means having a reflection portion where said outgoing light beam from said second focusing means is focused.

8. An optical detection apparatus as claimed in claim 7, wherein said coupler is a focusing grating coupler, said photodetectors being a junction type photodiode, said reflector means being one or more diamond-shaped waveguide mirrors each of which has a suitable reflection surface capable of reflecting a part of an incoming light beam from said second focusing means so that said incoming light beam is divided into two separate beams and each of said two separate beams are received by each of said photodetectors, and said second focusing means having two lens portions which are formed from a convex waveguide lens being cut into two halves and are provided on the waveguide such that one of cut surfaces of the two halves faces a direction opposite to the other cut surface and one half being aligned at its bottom in contact with the other at its top.

9. An optical detection apparatus provided on an optical integrated circuit which includes a waveguide, a light source for emitting light, a light converging part for converging the emitted light from the light source on a position of a target object so that the converged light is reflected from the target object, a coupler for coupling the light reflected back from the target object with the waveguide so that the light coupled with the waveguide is propagated as a guided light in the waveguide, and a light detection part for detecting the guided light propagated in the waveguide and supplying a detection signal from the detected light, the light detection part including one or more sets of two adjacent photodetectors and one or more light-insensitive areas between the two adjacent photodetectors of each said set, said optical detection apparatus comprising:

waveguide focusing means provided on said waveguide for focusing the guided light propagated in the waveguide into a focused light beam propagated in the waveguide and for splitting the focused light beam into two separate light beams; and reflector means for reflecting each of the focused light beams from the waveguide focusing means so that the focused light beam is split into two separate light beams, each of which is led to and received by the two adjacent photodetectors of any of said one or more sets, said waveguide focusing means being integrally formed with the waveguide and provided adjacent to each of said light-insensitive areas.

10. An optical detection apparatus as claimed in claim 9, wherein said waveguide focusing means, said reflector means, and said light detection part of the optical integrated circuit are arranged at predetermined relative positions on said waveguide, thereby allowing the quantity of light received by each of said two adjacent photodetectors of each said set to be varied asymmetrically depending on the target object's deviation from the focus position of the converged light given by the light converging part.

11. An optical detection apparatus as claimed in claim 9, wherein said waveguide focusing means has two equal slanting surfaces which allow said two adjacent photodetectors of each said set to receive, respectively, said two separate light beam with the same quantity of light from said light focusing means.

* * * * *